United States Patent [19]
Maroschak

[11] 3,854,527
[45] Dec. 17, 1974

[54] APPARATUS AND METHOD FOR FABRICATING CORRUGATED PLASTIC TUBING

[76] Inventor: Ernest J. Maroschak, Box 878, Roseboro, N.C. 28382

[22] Filed: Sept. 1, 1972

[21] Appl. No.: 285,669

[52] U.S. Cl.................................. 165/120, 15/306
[51] Int. Cl................................................ F24h 3/02
[58] Field of Search............ 165/120, 60; 15/306 A

[56] References Cited
UNITED STATES PATENTS

| 2,466,769 | 4/1949 | Herold et al. | 165/120 |
| 3,370,648 | 2/1968 | Bigelow, Jr. et al. | 165/120 |
| 3,736,618 | 6/1973 | Ramsey | 15/306 A |

Primary Examiner—Charles Sukalo
Attorney, Agent, or Firm—Parrott, Bell, Seltzer, Park & Gibson

[57] ABSTRACT

An apparatus and method for manufacturing corrugated plastic tubing and which comprises an extruder having an extrusion die for extruding a smooth tube of hot plastic material, blow molding means positioned adjacent the extruder for forming annular corrugations in the tube, and tube cooling means positioned adjacent the blow molding means for cooling the tube. The tube cooling means includes a housing defining a first zone wherein a plurality of streams of liquid coolant are directed against the tube advancing therethrough, and a second zone wherein the adhering residual liquid coolant is wiped from all surfaces of the corrugated tube by a high velocity current of air. The blow molding means and the tube cooling means are slidably supported and fixedly connected to each other so that they may be withdrawn from the extruder to permit servicing of the extrusion die. Also, the blow molding means includes a plug carried by a mandrel attached to the extruder by a quick disconnect coupling such that the plug may be disconnected and advanced through the cooling chamber to cool the same prior to cleaning and servicing thereof.

9 Claims, 9 Drawing Figures

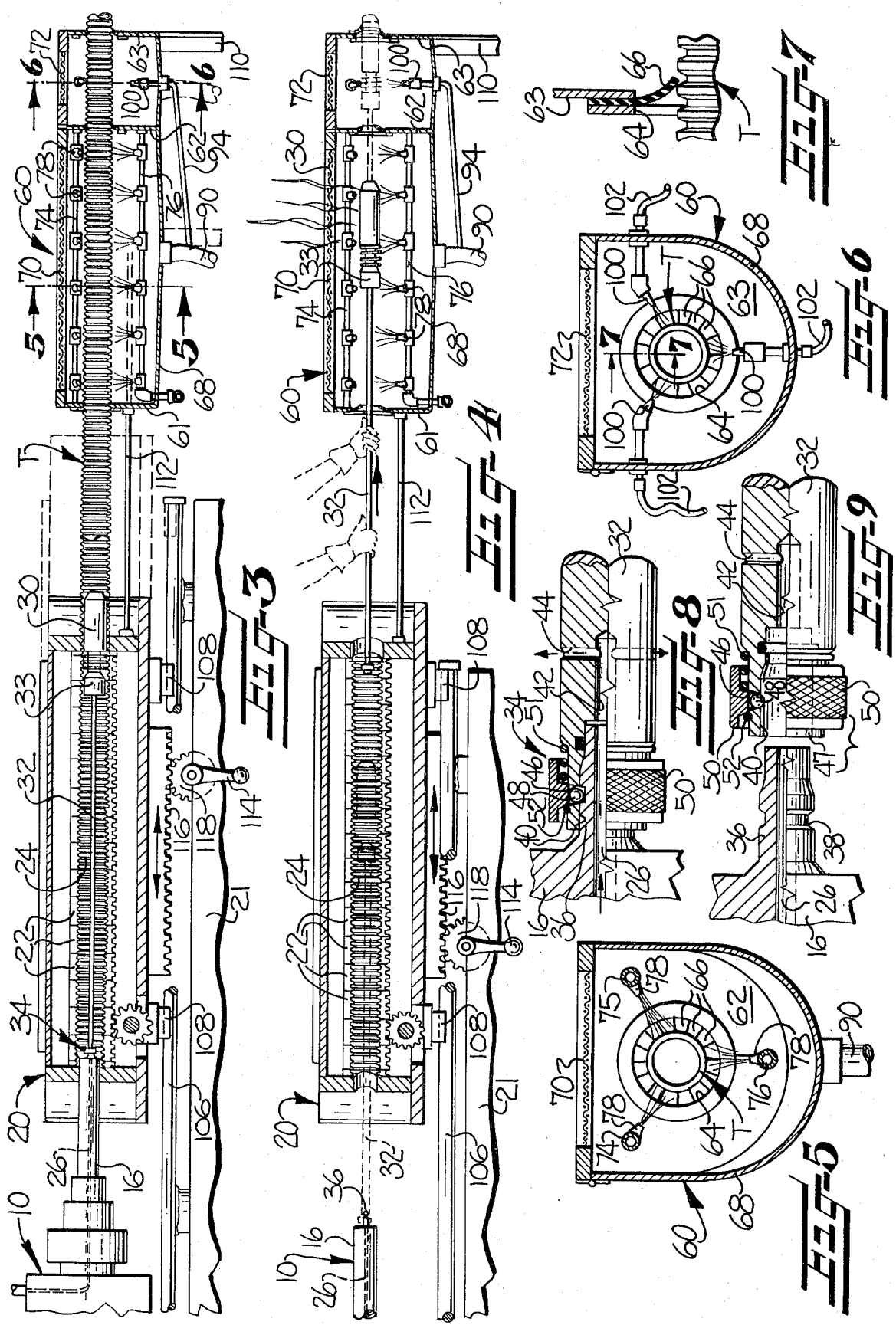

APPARATUS AND METHOD FOR FABRICATING CORRUGATED PLASTIC TUBING

The present invention relates to an apparatus and method for manufacturing corrugated plastic tubing for use, for example, as drainage pipe, irrigation pipe or in septic tank drainage fields and the like.

Corrugated plastic tubing is presently manufactured by a process wherein a smooth tube of hot plastic material is initially extruded, and the smooth tube is then corrugated by passing the same into a blow molding apparatus comprising semitubular mold sections arranged for movement along a path of travel defining a tubular passageway. Pressurized air is introduced into the passageway to move the tube against the outline of the mold sections to form corrugations therein, and a plug is positioned within the passageway at the discharge end thereof to maintain the pressure therewithin.

Upon leaving the blow molding apparatus in the above process, the tube is at an elevated temperature and is thus easily deformed or stretched during subsequent handling or further processing. For example, if the tube is coiled while at an elevated temperature, the tube will assume the coiled configuration and "set" upon cooling making it difficult if not impossible to uncoil. In an attempt to avoid such deformation, it has been proposed to convey the tube along a sinusoidal path to permit the same to be cooled by contact with the air prior to being coiled, stacked, or otherwise further processed. However, such procedure not only requires a great deal of space, but the movement of the tube along its sinusoidal path often results in an unacceptable degree of deformation during the cooling operation. It has also been proposed to run the production equipment at speeds below full capacity to reduce the overall temperature of the blow molding apparatus such that the tube exits therefrom at a somewhat lower temperature. This latter alternative however is obviously unacceptable since it reduces production efficiency.

While it is known to cool smooth surfaced tubing as its exits from the extruder by passing the tubing horizontally into and through a cooling bath, such procedure is not suitable in the case of corrugated tubing since there is no effective way to seal the corrugated tube as it enters and leaves the container of the bath.

It is accordingly an object of the present invention to provide an apparatus and method for forming an annularly corrugated plastic tube at a high rate of production, and cooling the same to prevent deformation or stretching during subsequent handling or processing.

It is another object of the present invention to provide an apparatus and method for cooling an annularly corrugated plastic tube by the application of a liquid cooling medium to the hot tube, and wherein substantially no leakage of the cooling medium outside the cooling chamber results.

It is a further object of the present invention to provide an apparatus and method for cooling an annularly corrugated plastic tube by spraying a liquid coolant on all surfaces of the corrugated tube and wherein the tube exiting from the cooling chamber is substantially dry so that the liquid does not interfere with subsequent processing.

It is still another object of the present invention to provide an apparatus of the described type which is easily serviceable in that the blow molding apparatus and cooling chamber may be quickly and easily withdrawn from the extruder to permit access to the extrusion die, and wherein the plug in the blow molding apparatus may be easily disconnected and translated into and through the cooling chamber such that it may be reached for servicing in a cooled condition.

These and other objects and advantages of the present invention are achieved in the embodiment illustrated herein by the provision of an apparatus which comprises an extruder having an extrusion die for extruding a smooth tube of hot plastic material, blow molding means positioned immediately adjacent the extruder for forming annular corrugations therein, and tube cooling means positioned adjacent the blow molding means. The blow molding means and the tube cooling means are both supported for limited longitudinal movemenet toward and away from the extruder, and they are interconnected to permit unitary movement so that the extruder may be easily reached to permit servicing thereof. The tube cooling means includes a housing defining a first zone wherein a plurality of streams of liquid coolant are directed against the tube advancing therethrough, and a second zone wherein the adhering residual liquid cooling is wiped from all surfaces of the corrugated tube by a high velocity current of air.

Some of the objects and advantages of the invention having been stated, others will appear as the description proceeds, when taken in connection with the accompanying drawings, in which FIG. 1 is a schematic perspective view of an apparatus embodying the features of the present invention;

FIG. 3 is a sectional side elevational view, partly schematic, of the blow molding apparatus and cooling chamber of the present invention;

FIG. 4 is a view similar to FIG. 3 but showing the blow molding apparatus and cooling chamber withdrawn from the extrusion die;

FIG. 5 is a sectional end view showing a first zone of the cooling chamber and taken substantially along the line of 5—5 of FIG. 3;

FIG. 6 is a sectional end view showing a second zone of the cooling chamber and taken substantially along the line 6—6 of FIG. 3;

FIG. 7 is a fragmentary sectional view illustrating the sealing flaps positioned about the openings of the cooling chamber;

FIG. 8 is a fragmentary, partly sectioned, side elevational view of the quick disconnect coupling between the extruder and mandrel; and FIG. 9 is a view similar to FIG. 8 but showing the coupling disconnected.

Figure 1:
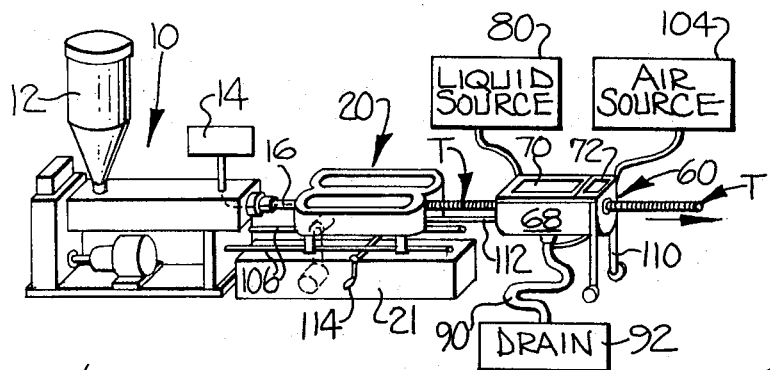

Referring more specifically to the drawings, a generally conventional extruder is shown at 10, the extruder including a hopper 12 for receiving plastic granules, and a source 14 of pressurized air or other gas for the purposes hereinafter further described. The extruder includes an extrusion die at 16 for extruding a smooth tube of hot plastic material.

A blow molding apparatus 20 is positioned immediately adjacent the extruder 10 and is adapted to receive the extruded tube of hot plastic material therefrom and form annular corrugations therein. The blow molding apparatus 20 is slidably mounted on a fixed support 21 as hereinafter further described, and includes two sets of cooperating substanially semitubular mold sections 22 arranged for successive movement along an endless path of travel such that cooperating pairs of mold sections define a horizontal tubular passageway 24 as seen in FIG. 3. Each mold section 22 has transverse semicircular internal alternating ribs and valleys with the ribs and valleys of one section of each pair cooperating with the ribs and valleys of the other section of the same pair to form annular ribs and valleys as the mold sections advance along the path of travel.

The source 14 of pressurized air communicates with the passageway 24 via the aperture 26 extending through the extruder 16. Thus as the smooth tubular plastic material exits from the extruder 16, the pressure within the passageway 24 moves the tube of hot plastic material outwardly against the annular ribs and valleys of the mold sections to form annular corrugations therein. The term "annular corrugations" as used herein means not only corrugations in the form of individual circular ribs and valleys around the plastic tube, but also includes spiral or helical ribs and valleys extending around and along the length of the corrugated tube. Also, some of the ribs of the corrugations may be interrupted at spaced intervals for the purpose of facilitating the drilling of apertures or drainage holes through the tube at such interruptions.

A plug 30 is carried within the discharge end of the passageway 24 for maintaining the pressure therewithin, the tubular plastic material passing between the plug 30 and mold sections with the plug 30 closely conforming to the internal diameter of the corrugated tube. A mandrel 32 extends coaxially through the passageway, and interconnects the plug 30 and extruder 16 to prevent the longitudinal movement of the plug. A sleeve 33 is slidably mounted on the mandrel 32 intermediate the plug 30 and extruder 16, the sleeve being adapted to move along the mandrel from the left to right as seen in FIG. 3 during the start-up of the apparatus to support the forward end portion of the tube during its initial movement through the passageway 24. More particularly, the sleeve 33 is initially positioned immediately adjacent the extruder such that the forward end of the tube produced during start-up is supported by the sleeve to prevent its collapse. Once the forward end portion is moved outwardly into contact with the mold sections 22, the sleeve is moved along the mandrel to a position immediately behind the plug 30. A quick disconnect coupling 34 as seen in FIGS. 8 and 9 interconnects the mandrel 32 and extruder 16 to permit removal of the plug 30, mandrel 32 and sleeve 33 from the passageway 24 for the purposes hereinafter further described.

The quick disconnect coupling 34 includes an outwardly directed integral post 36 carried centrally on the leading end of the extruder 16, the post having a central aperture communicating with the aperture 26 of the air pressure system, and a circumferential channel 38. The rearward end of the mandrel includes a recess 40 adapted to closely receive the post 36, and central aperture 42 communicating with the radial apertures 44. A tapered radial opening 46 extends through the wall 47 defined by the recess 40, and the opening 46 mounts a ball detent 48. A longitudinally translatable sleeve 50 is carried about the wall 47, the sleeve being normally held in the position shown in FIG. 8 by the action of the spring 51 and lock ring 52. Thus in its normal position, the sleeve holds the ball detent 48 within the channel 38 to maintain the interconnection of the mandrel 32 and extruder 16, but upon translation of the sleeve 50 toward the right as seen in FIGS. 8 and 9, the ball detent is released and the members may be disconnected by the application of an axial force to the mandrel.

A tube cooling chamber 60 is positioned adjacent the blow molding apparatus 20 and is adapted to receive the corrugated tube T exiting therefrom. The cooling chamber 60 comprises a housing which includes three horizontally spaced vertical walls 61, 62, and 63 definig a first zone between the walls 61 and 62 and a second zone between the walls 62 and 63. Each of the walls has an opening 64 (note FIG. 7) for passage of the tube therethrough in a horizontal direction, and sealing means 66 in the form of a circular series of radially directed flexible flap members are carried by each of the walls about the associated openings wipingly engaging the tube passing therethrough and for preventing substantial amounts of the liquid coolant from passing therethrough in a manner to become apparent. The housing further includes horizontally extending bottom and side walls defining a U-shaped trough 68 interconnecting the three vertical walls 61, 62, and 63. The trough 68 defines an open top (note FIG. 2) and a first cover 70 is hingedly connected along one edge of the trough for overlying the first zone, and a second independently operable cover 72 is hingedly connected to the same side edge of the trough to overlie the second zone. The two covers may be fabricated for a foraminous material, such as aluminum screening, to facilitate the escape of air therethrough.

The openings 64 in the three walls 61, 62, and 63 are horizontally aligned to define a central axis along which the tube T is adapted to travel. To rapidly cool the tube T, there is provided in the first zone three rows 74, 75 and 76 of spray nozzles extending horizontally along the length of the first zone, the three rows being positioned in an equally spaced circular arrangement about the central axis of the tube such that the liquid coolant is directed through the spray nozzles and thus contacts all of the surfaces of the corrugated tube passing therethrough. Thus in the illustrated embodiment, the three rows 74, 75, and 76 are spaced 120° from each other, and each row includes six individual spray nozzles 78.

Viewing FIG. 5, it will be observed that the lowermost row 76 of nozzles is directed to impinge upon the botom of tube T. This is desirable since many tube corrugating machines are designed with a built-in cooling device along the upper surface, and this results in the tube produced by such equipment being much hotter along its bottom side. Thus by directing a stream of liquid coolant directly upon the bottom of the tube, the hot bottom side will be assured of adequate cooling.

The liquid coolant, which is typically water, is supplied to the nozzles 78 from a conventional source 80. The coolant may be directed via the pipe 81 and valve 82 through a suitable liquid cooling device 84, and then to the nozzles 78 via the pipe 85. An electrically operable shut off valve 86 may be positioned in the pipe 85, together with a flow control valve 88.

After being discharged through the nozzles 78 and onto the tube T, the liquid coolant is collected in the bottom of the housing trough 68, and directed through the flexible drain hose 90 to the drain 92. A second drain hose 94 leads from the bottom of the second zone of the cooling chamber to collect any liquid coolant which is removed therein. Alternatively, it may be desired to recirculate the liquid coolant, and in such case the drain line 90 may include a valve 95 for directing the liquid coolant into the recirculation line 96 which leads to the pipe 81 immediately above the cooling device 84. The line 96 includes a pump 98 for recirculating the liquid coolant under pressure through the system. During such recirculation, the valve 82 from the liquid source 80 may be closed, or it may be slightly opened to compensate for any losses of the liquid coolant during operation of the cooling chamber.

In the second zone of the cooling chamber, there is provided three jet nozzles 100 circularly arranged about the path of travel of the horizontally moving tube T. The nozzles 100 are connected by suitable hoses 102 to the pressure source 104 of gas, such as air, such that a high velocity current of air is directed through each of the nozzles to impinge upon all surfaces of the tube T to thereby effectively wipe the adhering residual liquid coolant from all exterior surfaces of the corrugated tube. In this regard, it will be appreciated that the flexible flap members 66 also serve to wipe some of the adhering residual liquid coolant from the tube as it passes from the first zone to the second zone of the housing. Also, it will be apparent that the foraminous cover 72 serves to permit the air introduced through the nozzles to be dissipated to the atmosphere. Still further, it will be understood that the high velocity stream of pressurized air impinging upon the tube T will also serve to further cool the same.

Figure 2:
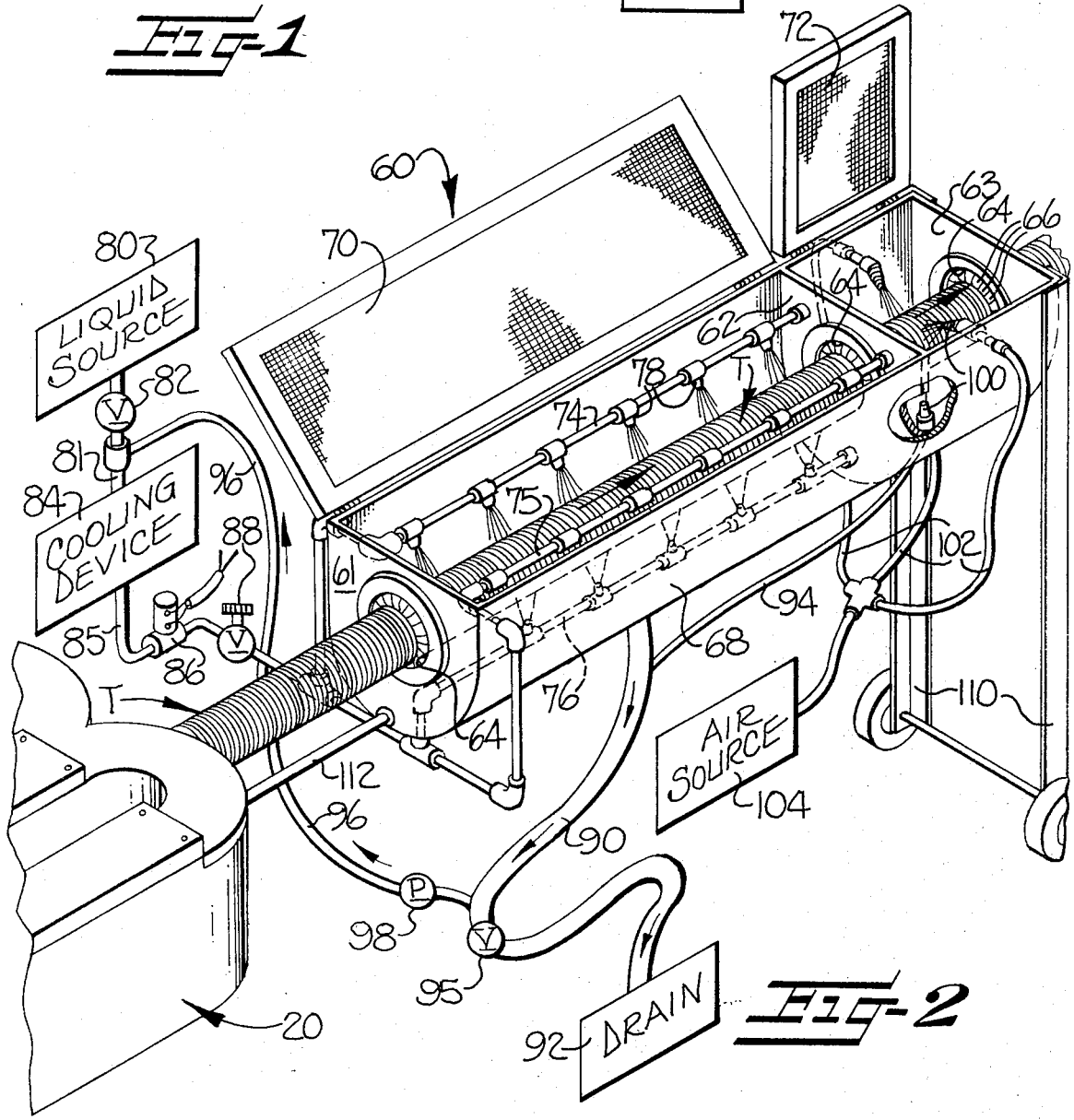
FIG. 2 is an enlarged perspective view of the cooling chamber of the apparatus shown in FIG. 1.

The blow molding apparatus 20 and the tube cooling chamber 60 are supported and interconnected to each other by a structure best illustrated in FIGS. 2–4. In particular, the supporting and interconnecting structure comprises the fixed support 21 for the blow molding apparatus 20, and means for slidably mounting the blow molding apparatus upon the support. The latter means comprises a pair of horizontal slide bars 106 fixed to the upper surface of the support 21, and a cooperating pair of gliders 108 resting on each slide bar and supporting the blow molding apparatus. A wheeled carriage 110 supports the remote end of the tube cooling chamber 60, and a rigid bar 112 extends between the blow molding apparatus and the rear end of the tube cooling chamber. A hand crank 114 is mounted on the support 21 and is operatively connected to the blow molding apparatus by the rack 116 and pinion 118 as shown schematically in FIG. 3, whereby the blow molding apparatus and tube cooling chamber may be moved toward and away from the extruder 16 by manual rotation of the hand crank 114.

Upon the blow molding apparatus and the tube cooling chamber reaching its extended position as shown in FIG. 4, the quick disconnect coupling 34 may be released by applying an axial force on sleeve 50 and the mandrel. The plug 30 and mandrel may then be advanced into and through the tube cooling chamber to thereby cool the plug as seen in FIG. 4. Thus, upon the plug reaching the far side of the cooling chamber as indicated in dashed lines in FIG. 4, the plug may be contacted by hand and cleaned or otherwise repaired.

It will be observed that the above described mounting structure for the blow molding apparatus 20 and the tube cooling chamber 60 also facilitates access to the die of the extruder 16 for servicing thereof. Thus when such servicing becomes necessary, the operation of the extruder is stopped and the blow molding apparatus and tube cooling chamber are advanced away from the extruder by turning the crank 114. The extruded tube is then cut from the die of the extruder with a knife or similar instrument, and the mandrel 32 disconnected by the application of an axial force to the coupling 34. Thus by a simple procedure, access may be quickly had to the die for immediate correction of any faults developing in the tube.

In the drawings and specification, there has been set forth a preferred embodiment of the invention, and although specific terms are employed, they are used in a generic and descriptive sense only and not for purposes of limitation.

That which is claimed is:

1. An apparatus adaptable for cooling a horizontally advancing hot annularly corrugated plastic tube following the molding thereof and wherein the tube is delivered in a dry condition to facilitate subsequent processing thereof, said apparatus comprising a housing including three horizontally spaced vertical walls defining a first zone between the first and second walls and a second zone between the second and third walls, each of said walls having an opening for passage of the tube therethrough in a horizontal direction, means located in said first zone for directing a plurality of streams of liquid coolant against the corrugated exterior surface of the advancing tube disposed in said first zone, and means in said second zone for directing a high velocity current of gas against the corrugated exterior surface of the advancing tube disposed in the second zone to remove the adhering residual liquid coolant therefrom and further cool the same.

2. The apparatus as defined in claim 1 wherein said means for directing a plurality of streams of liquid coolant against the tube includes a plurality of rows of spray nozzles extending horizontally through said first zone, said rows being circularly arranged about the path of travel of the tube therethrough.

3. The apparatus as defined in claim 2 wherein there are three of said rows of spray nozzles extending through said first zone, said three rows of nozzles being equally spaced about the path of travel of the tube therethrough with one of said rows being positioned to impinge upon the bottom of the advancing tube.

4. The apparatus as defined in claim 3, wherein said means for directing a high velocity current of gas against the tube comprises a plurality of jet nozzles circularly arranged about the path of travel of the tube through said second zone.

5. The apparatus as defined in claim 4, wherein each of said wall openings include sealing means for wipingly engaging the tube passing therethrough and for preventing substantial amounts of the liquid coolant from passing therethrough, said sealing means comprising a circular series of radially directed flexible flap members carried by the associated wall.

6. The apparatus as defined in claim 5, wherein said housing further includes horizontally extending bottom and side walls interconnecting said vertical walls to define a trough having an open top, and a cover means hingedly connected to said trough for overlying said open top.

7. The apparatus as defined in claim 6, wherein said cover means comprises a first cover overlying said first zone and a second independently operable cover overlying said second zone.

8. The apparatus as defined in claim 6, wherein at least a substantial portion of said cover means is foraminous to facilitate the escape of gas from the trough.

9. The apparatus as defined in claim 6 further including drain means operatively connected to said bottom wall of said housing for removing the liquid coolant therefrom.

* * * * *